Inventor
Joseph Reginald Parrish
by Shoemaker + Mattare
Attorneys

INVENTOR
JOSEPH REGINALD PARRISH

United States Patent Office 3,072,908
Patented Jan. 8, 1963

3,072,908
POSITION PLOTTING APPARATUS FOR USE WITH RADAR OR OTHER POSITIONAL INFORMATION SYSTEMS
Joseph Reginald Parrish, London, England, assignor, by mesne assignments, to W. H. Sanders (Electronics) Limited, Stevenage, England, a British company
Filed Nov. 18, 1957, Ser. No. 697,083
6 Claims. (Cl. 346—8)

This invention relates to the automatic or semi-automatic transfer of positional co-ordinates of a moving object, vehicle or target, usually the range and bearing of the object, to a plotting sheet.

The object of the invention is to provide a system and apparatus giving a record of several sets of changing co-ordinates as quickly as possible to enable an observer to assess the current trend of vehicle movements for purposes such as collision avoidance, when used with radar in ships, air traffic control, or for military purposes such as target tracking. The apparatus may also be used for transferring information, such as radar information, from one position to another. For example, the information on a radar screen may be conveyed from the darkened position of scanning room to the open daylight conditions of the ship's bridge or air traffic control room. The apparatus also provides means for obtaining permanent records of transient traffic situations for analysis at a later date.

The invention will be further described with reference to the accompanying drawings which illustrate diagrammatically two forms of apparatus suitable for installation in a ship for use in conjunction with radar equipment and in which.

Figure 1:
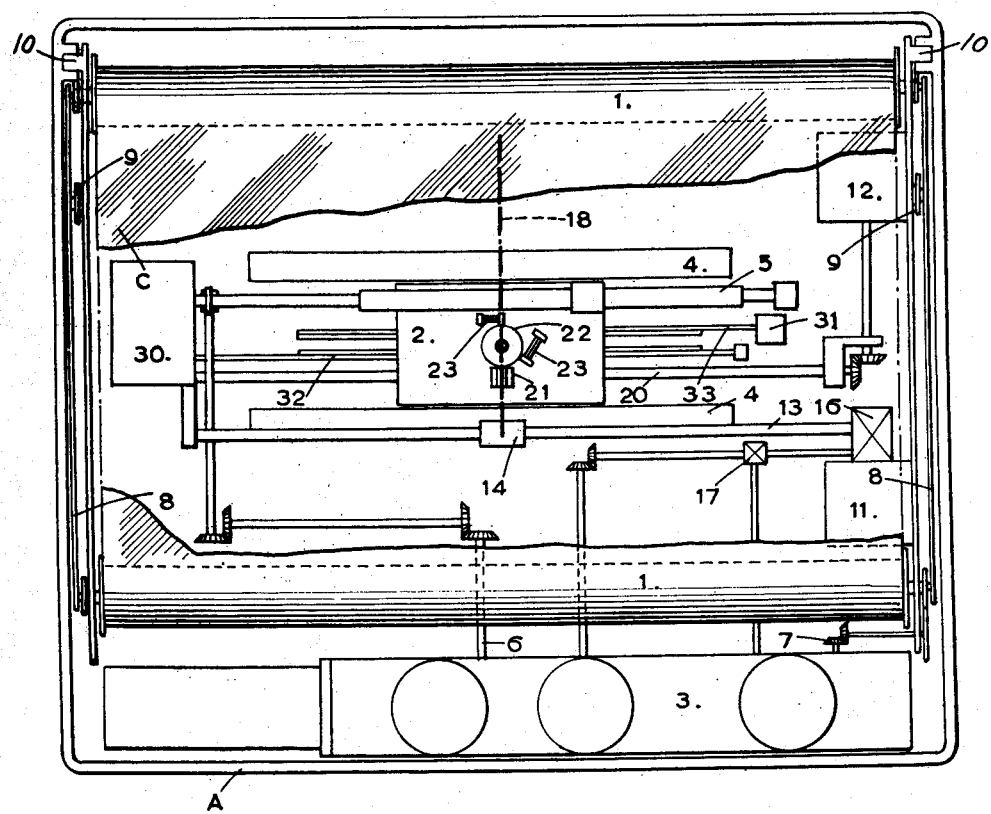
FIGURE 1 is a plan view partly in section.
Figure 2:
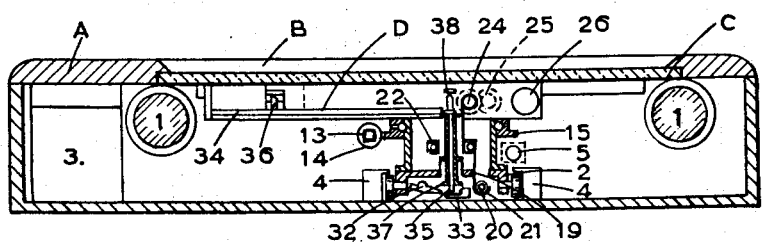
FIGURE 2 is a cross section.
Figure 2A:
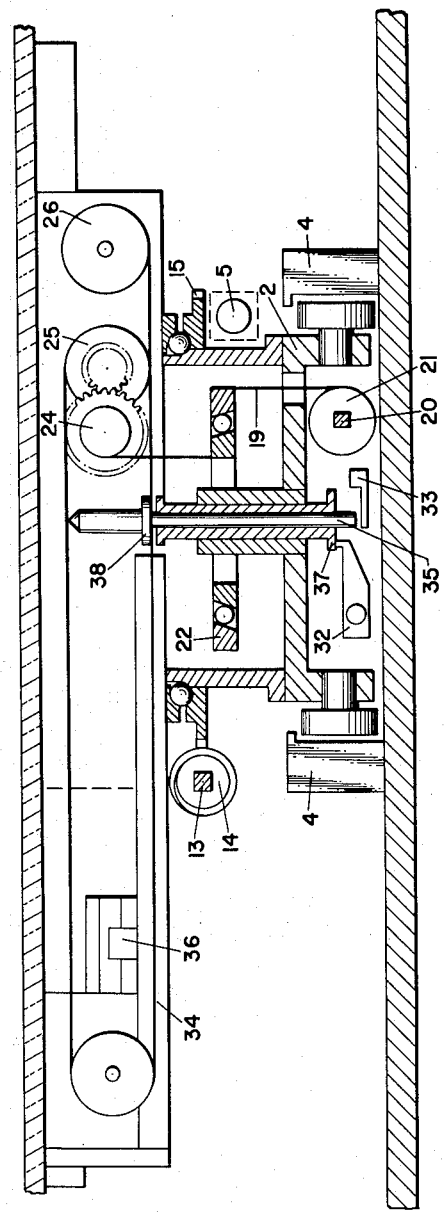
FIG. 2a is a view illustrating a portion of the structure of FIG. 2 on an enlarged scale.

Referring now to the drawings but first more particularly to FIGURES 1 and 2, the apparatus consists of a shallow container or cabinet A, the top surface of which has a panel B of glass or other transparent material.

Under the transparent panel B is supported a sheet C of paper of such a semi-transparent nature that marks printed on the underside may be seen from above, to facilitate which means of illumination (not shown) are provided within the cabinet. The paper C is carried between two rollers 1, 1 as shown in FIGURES 1 and 2 and may be moved, in the direction of the conventional $y$ axis, either upwards or downwards. Beneath the paper, with freedom to move transversely in the conventional $x$ axis, is a carriage 2 supporting a radial arm or gantry D which can be moved in azimuth to any required bearing. The gantry, further, supports a small apparatus which is movable to any required position along the gantry and operable to print a mark upon the underside of the paper as hereafter described.

The combined movements of the paper and carriage 2 can be arranged so that the centre of the carriage represents the movement of a ship and the gantry and printing head can be made to print a mark to correspond to any object shown on the radar screen of the ship. The paper thus depicts the true disposition of all ships, buoys, land and above-surface obstacles surrounding the ship at the time of the last printing operation and provides a record of previous prints from which useful information, such as course and speed, concerning the various radar targets may be derived.

In FIGURES 1 and 2 the items 1 and 2 are the paper rollers and carriage respectively. Their relative motions, equivalent to $V \cos \theta$ and $V \sin \theta$ respectively, where $V$ is ship's speed and $\theta$ ship's course, are controlled by the computor 3, one form of which is described hereafter. The carriage is constrained by two guides 4, so that it may move only in a transverse direction, which lateral movement is derived from the lead screw 5. The lead screw is rotated by the $V \sin \theta$ output 6 from the computor 3. The paper drive is taken from the $V \cos \theta$ output 7, to the bottom roller and then to the top roller and paper metering wheels 9 via the connecting rods 8. Both rollers are hollow with solid axle rods. The outer cylinders are connected to the axle rods through helical springs which enables the paper to be kept in tension and which allows the paper to be transported at the correct rate, despite the changing diameters of the rollers as the paper is fed from them or on to them. The correct paper movement is derived from the metering wheels which remain of course of constant diameter and which are equipped with short spikes which pierce the otherwise unperforated paper. The rollers are supported in a chassis which may be lifted about the pivots 10 to allow access to the printing mechanism and other apparatus below the paper.

The gantry, which is represented schematically at 18 in FIGURE 1 is rotated in azimuth by the motor 11 through the square shaft 13, which carries a sliding worm 14 with a square hole in its axis. The worm is maintained in the same position relative to the carriage by a yoke, not shown, and engages the worm wheel 15, FIGURE 2. A correction may be applied to the azimuth setting from information supplied to the computor, as described later, through the differential gear 16.

The motor 12 controls the position of the printing head through the square shaft 20 and the drum 21. The drum is free to slide on the square shaft but because its axial hole is square must rotate with the shaft. The drum is maintained in an accurate and constant position in relation to the carriage by means of a bracket which is not shown in the diagram.

Around the periphery of the drum is a flexible metal band or wire 19 which is fixed at its other extremity to one member of a thrust-race 22. The thrust-race is maintained in a plane parallel to the plane of the carriage by suitable links 23, or suitable guides and is prevented from rotating. The other member of the thrust-race is free to rotate and has attached to it another metal tape, the other end of which passes round a drum 24 FIGURE 2 carried in bearings in the gantry.

The gantry drum drives, through suitable gearing, the drum 25 FIGURE 2 controlling the inward movement of the printing head from the extremity of the gantry towards the centre by means of a wire. The whole system is kept in tension by means of a helical spring 26 FIGURE 2 tending to urge the printing head outwards by means of a wire passing round a pulley at the end of the gantry. Thus rotation of the motor 12 determines the position of the printing head.

The four main movements described above, namely paper movement, carriage movement, azimuth movement and printing head movement or range setting, are mechanically or remotely controlled by means hereinafter described, but the rotary inputs which effect these movements may be supplemented by differential gear units so that any of the movements may be set, adjusted or corrected by manual settings.

The printing function is performed by electro-mechanical means and the two necessary impressions, one for the target vessel and one marking the position of the observing vessel may be made simultaneously or independently as required. Two electro-magnetic coils, one in the housing 30 in FIGURE 1 and the other at 31 in the same diagram may give a small powerful angular movement to the two metal rods 32 and 33 suitable sections for which are shown in FIGURE 2. A rod or similar section 34 FIGURE 2 extends for the length of the gantry from the centre to the further extremity at which two points it is freely pivoted.

Energisation of coil 31, which may be caused at regular intervals of say three minutes or other convenient time interval, causes the flat rod 33 to strike the centre rod 35. This rod 35 then marks the position of the centre of the carriage on the underside of the paper by means described hereinafter. It will be seen that this initiates a series of marks representing the position of the observing ship at regular time intervals.

The position of the observed ship is marked by the energisation of the coil in housing 30, by the same technique except that the printing piece in the printing head is moved through the agency of the intermediary rod 34. The tubular anvil 37 when struck by the flat rod 32 causes the flat rod 34 to rotate and strike the underside of the printing piece 36. The collar 38 FIGURE 2 may or may not be fixed to the central rod 35. If it is fixed, then the printed record of the observing ship's position is made each time an observed target is printed, which may be required to relate the position of target and observing ship. The timing pulse for printing the observing ship's position is then not required. If the collar is omitted or left free to slide on the central rod 35, then only the time-regulated impressions of the observing ship's position are made which may be useful to keep a record of the course and speed when no targets are being plotted.

The range and azimuth settings may be transferred to the apparatus, hereinafter described as the plotter, from the radar screen by familiar techniques. For example, the motors 11 and 12 may be of the impulse or step-by-step type or they may be servo-motors. On radar equipments there are means for determining the precise range and bearing of a particular target. For example, in a typical case there may be a variable range marker in the form of an expandible ring of light which appears on the screen and the diameter of which may be controlled at the will of the operator through a mechanical control such as a rotatable knob. This knob may be mechanically coupled to the transmitting element of a servo-system or to the commutator of a step-by-step transmitter, the output of which is electrically connected to motor 12 to control the range setting of the plotter. Consequently, when the operator determines the range of a target by operating the variable range ring he simultaneously sets the printing head at the same range as the observed ship.

Similarly, radar equipments have controllable means of setting an azimuth indication on the screen and this angular information may, in a like manner to that described above, be transferred to the gantry of the plotter through the motor 11.

When both azimuth and range are set on the plotter the operator may energise the printing mechanism by means of a switch in the form of a press-button at the radar position. It is intended that the operator carry out this procedure for every required target on the radar screen, thus transferring the complete picture from the radar to the plotter, where it may be observed by the officer of the watch or other person. Other plotters may simultaneously be controlled to enable, for example, the captain in his cabin or the passengers of the ship to be kept informed of what is on the radar screen and the position of the observing ship. When the operator has caused all necessary targets to be plotted, the operation is repeated at a suitable interval, and since in the meantime the computor has caused the paper and carriage in the plotter to assume new positions according to the ship's own course and speed, a complete record to scale is derived, describing in detail the ship's progress and the disposition of other vessels, navigational facilities and navigational hazards.

Figure 3:
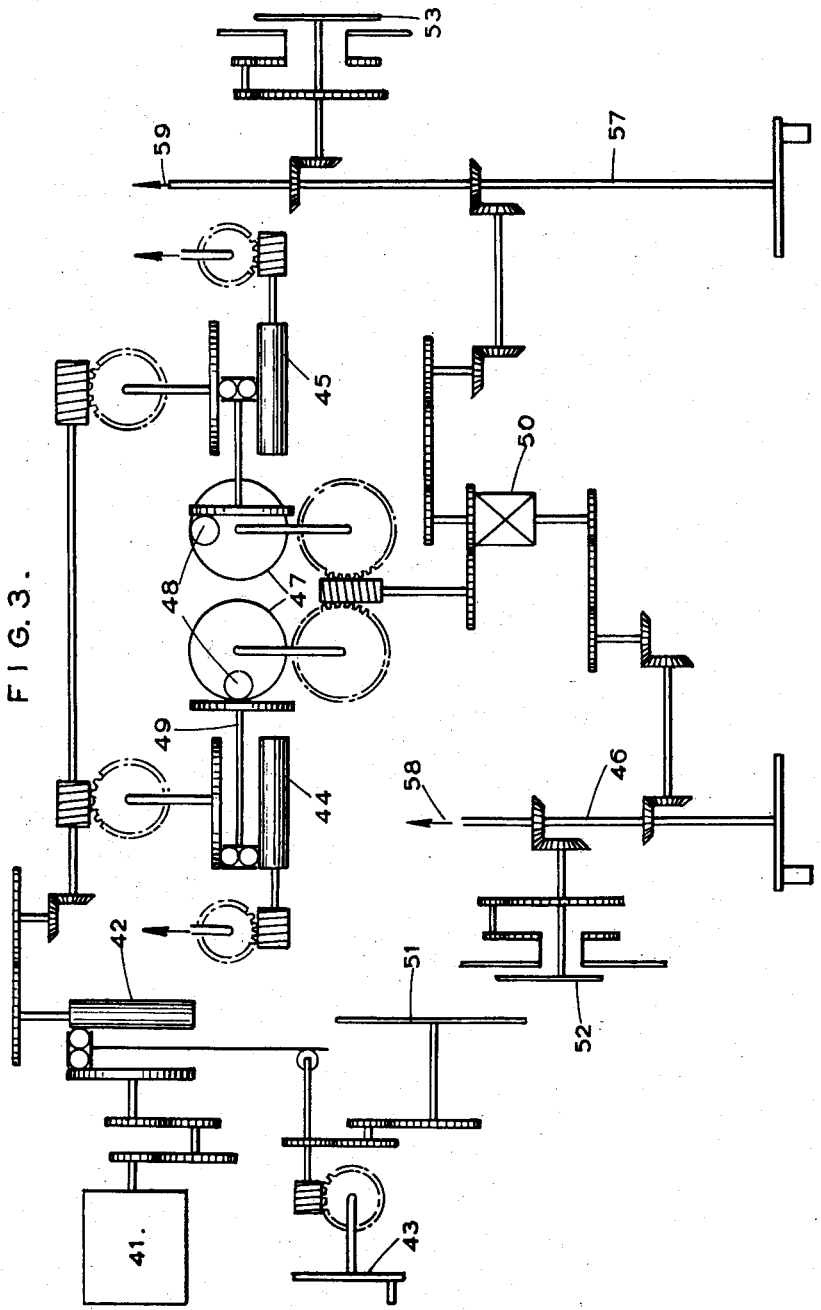
FIGURE 3 is a diagrammatic lay-out of a suitable computor and drive mechanism of apparatus for the semi-automatic recording of the plot of an object or objects.

The schematic diagram in FIGURE 3 shows one convenient form of computor for controlling the position of the carriage moving the paper and providing the necessary power.

A motor 41, controlled to give a constant speed output, is connected through suitable gearing to a ballplate integrator 42, FIGURE 3, or other variable speed device. The variable speed gear is adjusted through the control 43, either manually or automatically from the ship's log or speed indicator.

The output, which now corresponds to the ship's speed, is fed to the input of two ball-plate integrators 44 and 45. The ship's course is fed into the gearing 46, manual rotation aligns two discs 47 which are the rotating elements of two sine/cosine generators, customarily known as Scotch Yokes. The discs carry suitable projections 48 which adjust the ball positions in the ball-plate integrators. The rods 49 are held in tension against such projections 48 by means of a spring (not shown) coupling the rods together. It will be observed that if the discs are in suitable phase relationship, i.e. 90° out of phase, the outputs from the rollers are proportional to ship's speed multiplied by the sine and co-sine of the ship's course. These outputs as previously described control the carriage movement and paper movement respectively.

It is convenient that the paper movement should be in the general direction of the ship's progress, for if it is, not much re-adjustment will be necessary each time the carriage reaches one side of the plotter. A further control 57 is applied to the setting to the Scotch Yokes through the differential gear 50. In this fashion it may be observed the true course setting may be applied to control 46, the paper heading to control 57, and the resultant of these angular settings will be applied to the Scotch Yokes.

The quantities representing speed, course and paper heading, i.e. the true direction which paper movement represents, may be observed from the suitably scaled dials 51, 52 and 53, which are mechanically coupled to the input shafts.

It will be appreciated that both of the azimuthal settings are required to be applied to the gantry of the plotter and this is achieved by coupling the output shafts 58 and 59 which are directly connected to the input controls to the shaft 13 in FIGURE 1 through differential gears.

Facilities for printing time on the paper will be provided, thus providing a time record conveniently adjacent to the edge of the sheet in juxtaposition to the plots provided by the printers.

It will be appreciated that in the case of slow vessels or when the component of the vessel's track which is responsible for paper movement is small, the printing mechanism may be blocked until the next time record will be clear of the last one printed.

Figure 4:
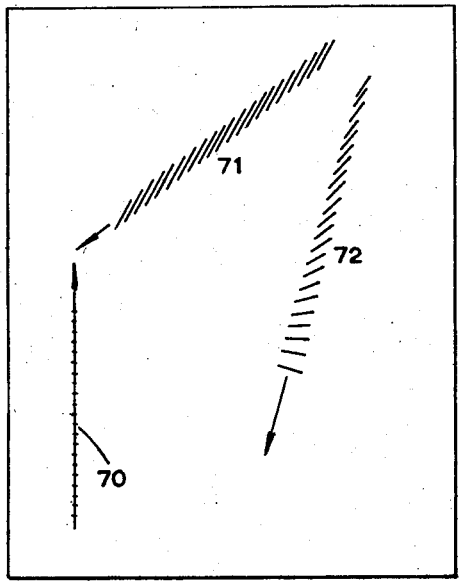
FIGURES 4, 5 and 6 show particular examples of plots produced by the apparatus.
Figure 5:
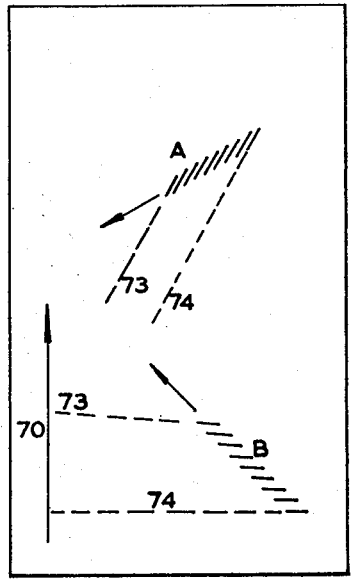
Figure 6:
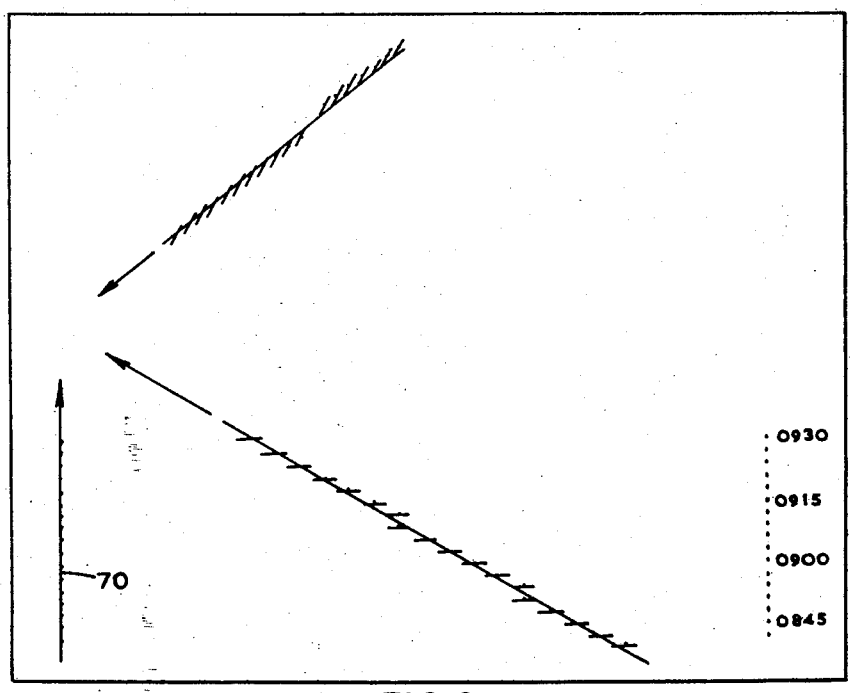

The nature of the printed mark is of considerable significance. If instead of a point defining the position of the ship, a short length of the bearing of the ship is printed as shown in FIGURE 4 by having a chisel shaped printer conveniently aligned with its axis parallel to the gantry, it may be readily appreciated by an observer whether a target ship is on a dangerous course or not. If the target ship is on a collision course all the bearings printed will be parallel, and if the successive prints are made at fairly regular intervals the distinctive visual pattern produced has the character shown at 71, FIGURE 4. A ship on a safe course with respect to the observing ship produces prints with an irregular pattern, with the bearings gradually changing as in 72, FIGURE 4, which is a plot of a vessel which will pass astern of the observing ship. In FIGURES 4-6 the track of the observing ship is represented by the vertical line 70.

If it is difficult to determine whether a ship is on a precise collision course or not, the manual plotter may be maintained on constant azimuth in the direction of the doubtful target and successive plots taken while the range control is varied as shown at 73, FIGURE 5. After a suitable interval the procedure is repeated as shown at 74, FIGURE 5, and from the extended bearing lines it may be seen whether the target is on a collision course or is going to pass. In general, such practice which is illustrated in FIGURE 5 for collision case A and near miss case B it is the object of the mariner to clear the approaching vessel by at least two or three miles.

FIGURE 6 illustrates the type of plot produced by the automatic photo-cell operated plotter. Although the plots are not at the precise range of the target vessel, i.e. their centre points do not lie on the track shown by the solid line, it can be determined that the two target vessels are on collision courses because the bearings remain constant, i.e. the successive prints of each target vessel are parallel.

The chisel pointed printer may carry a thickening at the centre or be broken in the middle so that when the manual plotter is used a precise indication of range is recorded. That is to say, the edge of the printer is relatively sharp to provide a substantially narrow or thin printed line. The central portion of such edge is preferably provided with either an interruption or an enlarged portion so that such central portion is easily recognized and established on the plotting sheet for use as a reference point when it is desired to obtain a range reading.

It will be appreciated that the specific apparatus described is given by way of example and that the invention comprehends systems and apparatus correlating successive positional and bearing indications of vehicles and objects whether obtained by radar, echo or visual means, and with particular reference to collision avoidance in the air or at sea.

What I claim is:

1. Apparatus for transferring positional co-ordinates of an object shown on a radar screen to a plotting sheet, comprising a casing, a plotting sheet disposed in said casing, means for continuously moving said plotting sheet in one direction in accordance with an observing vessel's speed and direction, a carriage mounted within said casing for movement transversely of the direction of plotting sheet movement, means for moving said carriage in accordance with the speed and direction of the observing vessel, an arm mounted on said carriage for rotational movement relative thereto, means for rotating said arm to an angular position relative to said carriage in accordance with the azimuth of an observed object, a printing element carried by said arm for movement longitudinally therealong, means for moving said printing element along said arm in accordance with the range of the observed object, said printing element normally being out of engagement with said plotting paper, means for selectively periodically urging said printing element into contact with said plotting sheet for making a discrete mark on the plotting sheet to indicate the range and azimuth of a particular object after such range and azimuth have been predetermined by radar, said selective means for urging the printing element into contact with the plotting sheet permitting the indication of a plurality of objects in true geographical relationship to one another, a second printing element mounted on said carriage for printing marks indicative of the observing vessel's position.

2. Apparatus according to claim 1 wherein the first mentioned printing element is in the form of a chisel-like member, the major axis of said member being parallel to the arm and passing through the plot of the observing vessel at the moment of printing so as to print a succession of short lines on the plotting sheet.

3. Apparatus according to claim 1 wherein said second printing element is normally out of contact with said plotting sheet, and means for urging said second printing element into contact with said plotting sheet at regular time intervals.

4. Apparatus for transferring positional co-ordinates of an object shown on a radar screen to a plotting sheet comprising a casing, a plotting sheet mounted in said casing, means for moving said plotting sheet relative to said casing in one direction in accordance with an observing vessel's speed and direction, a carriage mounted within said casing for movement transversely of the direction of the plotting sheet movement, means for moving said carriage in accordance with the speed and direction of the observing vessel, first printing means for periodically printing the position of an observing ship upon said plotting sheet, second printing means in said casing, means for supporting said first and second printing means on said carriage, means mounting said second printing means for movement relative to the first printing means in accordance with the azimuth and range of an observed object, said second printing means being normally out of contact with said plotting sheet and including an elongated printing element being effective to print an elongate line on the plotting sheet when contacted with the same, means for periodically moving said second printing means into engagement with said plotting sheet whereby a succession of spaced, elongate lines are printed on the plotting sheet in accordance with the relative position and range of an observed object, the elongate lines passing through the plot of the observing vessel at the moment of printing.

5. Apparatus for transferring positional coordinates of an object shown on a radar screen to a plotting sheet, comprising a casing, a plotting sheet in cooperative relation with said casing, means for moving said plotting sheet in accordance with an observing vessel's speed and direction, carriage means within said casing for movement transversely of the direction of the plotting sheet movement, means in operative relationship with said carriage means for moving said carriage means in accordance with the speed and direction of the observing vessel, support means mounted on said carriage means for rotational movement relative thereto, means in operative relationship with said support means for rotating said support means to an angular position relative to said carriage means in accordance with the azimuth of an observed object, printing means carried by said support means, means for moving said printing means relatively to said support means in accordance with the range of the observed object, said printing means normally being out of engagement with said plotting sheet, means for periodically urging said printing means into contact with said plotting sheet for making a printed indication on the plotting sheet, and printing means mounted on said carriage for making a printed indication on said plotting sheet indicative of the observing vessel's position.

6. Apparatus according to claim 5 wherein said second printing element is normally out of contact with said plotting sheet, and means for urging said second printing element into contact with said plotting sheet at regular time intervals.

References Cited in the file of this patent

UNITED STATES PATENTS

| | | | |
|---|---|---|---|
| 1,293,747 | Ford | Feb. 11, | 1919 |
| 1,738,808 | Walker | Dec. 10, | 1929 |
| 2,406,798 | Burroughs | Sept. 3, | 1946 |
| 2,432,303 | Fox | Dec. 9, | 1947 |
| 2,437,243 | Curtis | Mar. 9, | 1948 |
| 2,622,240 | Williams | Dec. 16, | 1952 |
| 2,750,247 | Turner | June 12, | 1956 |
| 2,759,783 | Ross | Aug. 21, | 1956 |
| 2,872,272 | Schuck | Feb. 3, | 1959 |

FOREIGN PATENTS

| | | | |
|---|---|---|---|
| 337,445 | Germany | May 31, | 1921 |